US010637343B2

(12) United States Patent
Fujii et al.

(10) Patent No.: US 10,637,343 B2
(45) Date of Patent: Apr. 28, 2020

(54) POWER CONVERSION DEVICE FOR RELIABLE CONTROL OF CIRCULATING CURRENT

(71) Applicant: MITSUBISHI ELECTRIC CORPORATION, Chiyoda-ku, Tokyo (JP)

(72) Inventors: Toshiyuki Fujii, Tokyo (JP); Takushi Jimichi, Tokyo (JP); Ryosuke Uda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 11 days.

(21) Appl. No.: 15/758,922

(22) PCT Filed: Sep. 17, 2015

(86) PCT No.: PCT/JP2015/076430
§ 371 (c)(1),
(2) Date: Mar. 9, 2018

(87) PCT Pub. No.: WO2017/046908
PCT Pub. Date: Mar. 23, 2017

(65) Prior Publication Data
US 2019/0044427 A1    Feb. 7, 2019

(51) Int. Cl.
*H02M 1/08*     (2006.01)
*H02M 7/48*     (2007.01)
(Continued)

(52) U.S. Cl.
CPC .............. *H02M 1/08* (2013.01); *H02M 7/48* (2013.01); *H02M 7/483* (2013.01); *H02M 7/797* (2013.01);
(Continued)

(58) Field of Classification Search
CPC .... H02M 7/483; H02M 7/5387; H02M 7/217; H02M 7/219; H02M 7/484;
(Continued)

(56) References Cited

U.S. PATENT DOCUMENTS 5,065,304 A * 11/1991 Tamai ............... H02M 7/53875
363/95
6,242,895 B1 * 6/2001 Fujii ........................ G05F 1/70
323/207
(Continued)

FOREIGN PATENT DOCUMENTS

EP     2 486 645 A1    8/2012
JP    2012-531878 A   12/2012
(Continued)

OTHER PUBLICATIONS

Extended European Search Report dated Aug. 10, 2018, issued by the European Patent Office in corresponding European Application No. 15904097.1. (7 pages).
(Continued)

*Primary Examiner* — Adolf D Berhane
*Assistant Examiner* — Nusrat Quddus
(74) *Attorney, Agent, or Firm* — Buchanan Ingersoll & Rooney PC

(57) ABSTRACT

A power conversion device includes a plurality of leg circuits and a control device. The plurality of leg circuits correspond to respective phases of an AC circuit and connected in parallel between common first and second DC terminals. Each leg circuit includes a plurality of chopper cells each including an energy storage and cascaded to one another and at least one inductance connected in series to the plurality of chopper cells. The control device controls an
(Continued)

operation of only at least one chopper cell included in each leg circuit based on a circulating current which circulates through the leg circuits.

13 Claims, 7 Drawing Sheets

(51) Int. Cl.
*H02M 7/483* (2007.01)
*H02M 7/797* (2006.01)
*H02M 1/00* (2006.01)

(52) U.S. Cl.
CPC ............... *H02M 2001/0003* (2013.01); *H02M 2007/4835* (2013.01)

(58) Field of Classification Search
CPC ....... H02M 7/5383; H02M 2007/4834; H02M 2007/4835; H02M 2001/0003
See application file for complete search history.

(56) References Cited

U.S. PATENT DOCUMENTS

| | | | | |
|---|---|---|---|---|
| 9,252,681 | B2* | 2/2016 | Zhang | H02M 7/487 |
| 9,712,084 | B2* | 7/2017 | Kikuchi | H02M 7/483 |
| 2009/0244937 | A1* | 10/2009 | Liu | H02M 1/4216 363/46 |
| 2010/0118578 | A1* | 5/2010 | Dommaschk | H02M 7/483 363/127 |
| 2011/0280049 | A1* | 11/2011 | Mori | H02M 1/4216 363/25 |
| 2012/0195084 | A1* | 8/2012 | Norrga | H02M 7/483 363/127 |
| 2013/0155732 | A1* | 6/2013 | Wagoner | H02J 3/01 363/40 |
| 2015/0236603 | A1* | 8/2015 | Jimichi | H02M 5/293 363/37 |
| 2016/0329831 | A1* | 11/2016 | Mukunoki | H02M 7/483 |
| 2016/0336874 | A1* | 11/2016 | Kikuchi | H02M 7/483 |
| 2017/0047860 | A1* | 2/2017 | Fujii | H02M 7/483 |
| 2017/0054294 | A1* | 2/2017 | Lyu | H02J 3/01 |
| 2017/0170658 | A1* | 6/2017 | Tengner | H02J 3/1857 |
| 2017/0214334 | A1* | 7/2017 | Mukunoki | H02M 1/12 |
| 2018/0069488 | A1* | 3/2018 | Mukunoki | H02M 7/48 |
| 2018/0159422 | A1* | 6/2018 | Kikuchi | H02M 7/12 |

FOREIGN PATENT DOCUMENTS

| | | |
|---|---|---|
| JP | 2013-507100 A | 2/2013 |
| JP | 5189105 B2 | 4/2013 |
| WO | 2011/042050 A1 | 4/2011 |
| WO | 2014/133026 A1 | 9/2014 |
| WO | WO 2014/162620 A1 | 10/2014 |

OTHER PUBLICATIONS

Extended European Search Report dated Sep. 17, 2018, issued by the European Patent Office in European Application No. 15904099.7. (8 pages).
International Search Report (PCT/ISA/210) dated Dec. 22, 2015, by the Japanese Patent Office as the International Searching Authority for International Application No. PCT/JP2015/076430.
Written Opinion (PCT/ISA/237) dated Dec. 22, 2015, by the Japanese Patent Office as the International Searching Authority for International Application No. PCT/JP2015/076430.
Office Action (Notification of Reasons for Refusal) dated Nov. 27, 2018, by the Japan Patent Office in Japanese Patent Application No. 2017-540408 and English translation of the Office Action. (13 pages).
International Search Report (PCT/ISA/210) dated Dec. 22, 2015, by the Japan Patent Office as the International Searching Authority for International Application No. PCT/JP2015/076431. (4 pages).
Written Opinion (PCT/ISA/237) dated Dec. 22, 2015, by the Japan Patent Office as the International Searching Authority for International Application No. PCT/JP2015/076431. (4 pages).
International Search Report (PCT/ISA/210) dated Dec. 22, 2015, by the Japanese Patent Office as the International Searching Authority for International Application No. PCT/JP2015/076432. (5 pages).
Written Opinion (PCT/ISA/237) dated Dec. 22, 2015, by the Japanese Patent Office as the International Searching Authority for International Application No. PCT/JP2015/076432. (4 pages).
Office Action (Communication pursuant to Article 94(3) EPC) dated May 28, 2019, by the European Patent Office in corresponding European Patent Application No. 15904098.9. (6 pages).

\* cited by examiner (a)

(b)

(c)

POWER CONVERSION DEVICE FOR RELIABLE CONTROL OF CIRCULATING CURRENT

TECHNICAL FIELD

This invention relates to a power conversion device which converts power between an alternating current (AC) and a direct current (DC) and is suitably used, for example, in a power conversion device of a large capacity installed in a power system.

BACKGROUND ART

In a power conversion device of a large capacity installed in a power system, an output from a converter has a high voltage or a high current and hence the power conversion device is often configured with a plurality of converters being multiplexed in series or in parallel. By multiplexing converters, not only an effect of increase in capacity of the converter but also an effect of lowering in harmonics contained in a waveform of an output voltage as a result of combination of output voltages from the converters and resultant lowering in harmonic current which flows out to the power system can be achieved.

Examples of the power conversion device including multiplexed converters include a multilevel converter in which output terminals of a plurality of converters are cascaded. A modular multilevel converter (MMC) represents one of the multilevel converters. The modular multilevel converter includes a first arm connected to a DC terminal on a positive-electrode side and a second arm connected to a DC terminal on a negative-electrode side for each phase of an alternating current and each arm is configured with a plurality of converter cells (which are also referred to as chopper cells) being cascaded. The first arm and the second arm of each phase implement a leg. Each leg is provided with at least one reactor.

In the modular multilevel converter, a circulating current which circulates through a plurality of legs without flowing to the outside may flow and the circulating current should be controlled to 0 or a prescribed value. Techniques described, for example, in Japanese Patent No. 5189105 (PTD 1) and Japanese National Patent Publication No. 2012-531878 (PTD 2) have been known as the conventional techniques for control of a circulating current.

Japanese Patent No. 5189105 (PTD 1) discloses a multilevel converter having one control unit for controlling and lowering a circulating current for each arm (a phase module branch). Each control unit is given a branch voltage target value from a current control unit. In particular, this document discloses combination by the current control unit of a circulating voltage target value with another target value of a phase module branch as an add-on, that is, in a linear manner, (in a form of a sum or a difference) in order to generate a branch voltage target value.

Japanese National Patent Publication No. 2012-531878 (PTD 2) discloses connection of a harmonic compensator of an active control type to a reactor (an inductor) provided in a leg of each phase in order to control a circulating current. This harmonic compensator is configured to suppress a harmonic component higher in frequency than a fundamental component contained in a circulating current.

CITATION LIST

Patent Document

PTD 1: Japanese Patent No. 5189105
PTD 2: Japanese National Patent Publication No. 2012-531878

SUMMARY OF INVENTION

Technical Problem

More specifically, the power conversion device described in Japanese Patent No. 5189105 (PTD 1) combines a voltage command value for control of an electric quantity (a voltage and a current) of an AC terminal, a voltage command value for control of an electric quantity (a voltage and a current) of a DC terminal, and a voltage command value for control of a circulating current which circulates in the power conversion device with one another. Then, the combined voltage command value is provided to all converter cells (chopper cells).

An upper limit and a lower limit of a voltage value which can be output by each converter cell are determined by a voltage value of a capacitor of each converter cell and a circuit configuration of each converter cell. Therefore, each converter cell cannot output a voltage exceeding the determined upper limit and lower limit Therefore, for example, increase or decrease in voltage command value for control of electric quantities of an AC terminal and a DC terminal may restrict a voltage command value for control of a circulating current combined with these voltage command values. In this case, a voltage command value for suppressing a circulating current is not reflected on an output voltage from the converter cell. In contrast, under the influence by the voltage command value for control of a circulating current, a voltage command value for control of electric quantities of the AC terminal and the DC terminal is restricted, and consequently AC-DC conversion is not ideally achieved.

The power conversion device described in Japanese National Patent Publication No. 2012-531878 (PTD 2) is configured such that the harmonic compensator of the active control type connected to each reactor (inductor) suppresses a harmonic component higher in frequency than the fundamental component contained in the circulating current. The reactor, however, has such a characteristic that a current is more likely to flow as a frequency is lower (an admittance increases as a frequency is lower), and hence a DC current component and a fundamental component contained in the circulating current cannot be suppressed.

This invention was made in consideration of the problems described above and an object thereof is to provide a power conversion device capable of reliably controlling an AC electric quantity (an AC voltage and an AC current), a DC electric quantity (a DC voltage and a DC current), and a circulating current.

Solution to Problem

This invention is directed to a power conversion device which is connected between a DC circuit and an AC circuit and converts power between these circuits, and the power conversion device includes a plurality of leg circuits and a control device. The plurality of leg circuits correspond to respective phases of the AC circuit and are connected in parallel between common first and second DC terminals. Each leg circuit includes a plurality of chopper cells each including an energy storage and cascaded to one another and at least one inductance connected in series to the plurality of chopper cells. The control device controls operations of the plurality of chopper cells. The control device controls an operation of only at least one chopper cell included in each leg circuit based on a circulating current which circulates among the leg circuits.

Advantageous Effects of Invention

According to this invention, by setting only at least one of the plurality of chopper cells (converter cells) constituting each leg circuit as a chopper cell for control of a circulating current, an AC electric quantity (an AC voltage and an AC current), a DC electric quantity (a DC voltage and a DC current), and a circulating current can reliably be controlled.

DESCRIPTION OF EMBODIMENTS

Figure 1:
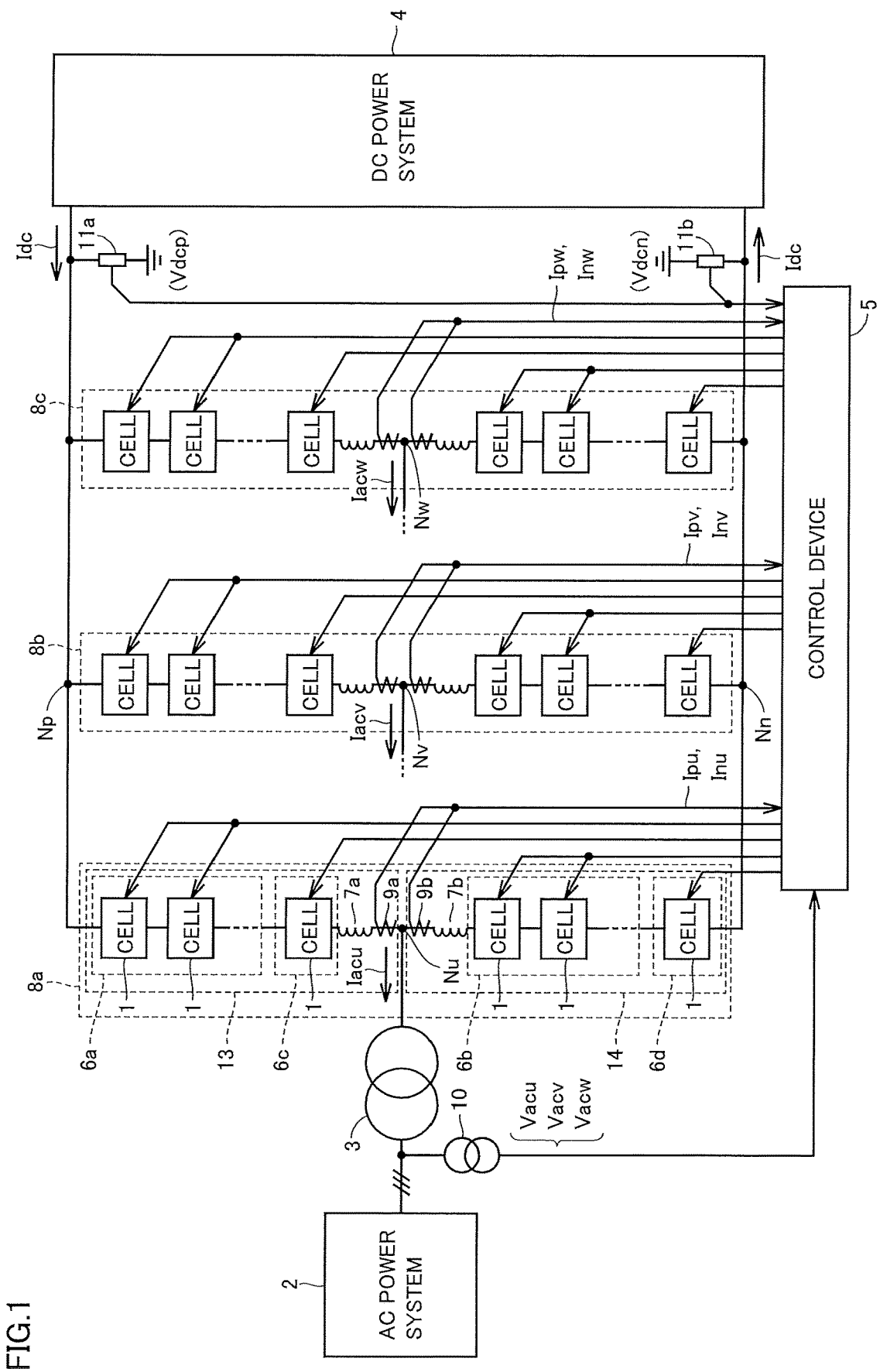
FIG. 1 is a schematic configuration diagram of a power conversion device according to a first embodiment.

Each embodiment will be described below in detail with reference to the drawings. The same or corresponding elements have the same reference characters allotted and description thereof will not be repeated.

First Embodiment

[Schematic Configuration of Power Conversion Device]
FIG. 1 is a schematic configuration diagram of a power conversion device according to a first embodiment. Referring to FIG. 1, the power conversion device includes leg circuits 8a, 8b, and 8c which are main circuits (which are denoted as a leg circuit 8 when they are collectively referred to or an unspecified one is referred to) and a control device 5 which controls these leg circuits 8.

Leg circuit 8 is provided for each of a plurality of phases implementing an alternating current and connected between an AC circuit 2 and a DC circuit 4, and converts power between these circuits. FIG. 1 shows three-phase AC circuit 2, and three leg circuits 8a, 8b, and 8c corresponding to a u phase, a v phase, and a w phase, respectively, are provided.

AC terminals Nu, Nv, and Nw provided in respective leg circuits 8a, 8b, and 8c are connected to AC circuit 2 with an interconnected transformer 3 being interposed. AC circuit 2 is, for example, an AC power system including an AC power supply. For facilitating illustration, FIG. 1 does not show connection of AC terminals Nv and Nw to interconnected transformer 3. DC terminals Np and Nn (a positive-side DC terminal Np and a negative-side DC terminal Nn) provided in common to leg circuits 8 are connected to DC circuit 4. DC circuit 4 is, for example, a DC power system including a DC power grid and another power conversion device which provides a DC output.

Instead of interconnected transformer 3 in FIG. 1, AC terminals Nu, Nv, and Nw may be connected to AC circuit 2 with an interconnected reactor being interposed. Instead of AC terminals Nu, Nv, and Nw, a primary winding may be provided in each of leg circuits 8a, 8b, and 8c, and leg circuits 8a, 8b, and 8c may be connected in an AC manner to interconnected transformer 3 or an interconnected reactor with a secondary winding magnetically coupled to the primary winding being interposed. In this case, the primary winding may be implemented by reactors 7a and 7b. Leg circuit 8 is electrically (in a DC or AC manner) connected to AC circuit 2 with a connection portion provided in each of leg circuits 8a, 8b, and 8c being interposed, such as AC terminals Nu, Nv, and Nw or the above-described primary winding.

Leg circuit 8a is divided into a positive-side arm (which is also referred to as an upper arm or a primary arm) 13 from positive-side DC terminal Np to AC input terminal Nu and a negative-side arm Nv (which is also referred to as a lower arm or a secondary atm) 14 from negative-side DC terminal Nn to AC input terminal Nu. A point of connection Nu between positive-side atm 13 and negative-side arm 14 is connected to transformer 3. Positive-side DC terminal Np and negative-side DC terminal Nn are connected to DC circuit 4. Since leg circuits 8b and 8c are also similarly configured, leg circuit 8a will be described below as a representative.

Positive-side arm 13 includes a cell group 6a in which a plurality of converter cells (chopper cells) 1 are cascaded, a cell group 6c in which a plurality of converter cells 1 are cascaded, and reactor 7a. Cell groups 6a and 6c and reactor 7a are connected in series to one another. For the sake of brevity, a converter cell (chopper cell) may be referred to as a cell below. Though FIG. 1 shows only a single cell 1 in cell group 6c for facilitating illustration, a plurality of cells 1 are actually cascaded.

Similarly, negative-side arm 14 includes a cell group 6b in which a plurality of cells 1 are cascaded, a cell group 6d in which a plurality of cells 1 are cascaded, and reactor 7b. Cell groups 6b and 6d and reactor 7b are connected in series to one another. Though FIG. 1 shows only a single cell 1 in cell group 6d for facilitating illustration, a plurality of cells 1 are actually cascaded.

Reactor 7a may be inserted in any position in positive-side arm 13 of leg circuit 8a, and reactor 7b may be inserted in any position in negative-side arm 14 of leg circuit 8a. A plurality of reactors 7a and a plurality of reactors 7b may be provided. The reactors may be different in inductance value. Only reactor 7a of positive-side arm 13 or only reactor 7b of negative-side arm 14 may be provided.

Cell groups 6a and 6c provided in positive-side arm 13 are referred to as a positive-side cell group and cell groups 6b and 6d provided in negative-side arm 14 are referred to as a negative-side cell group. As will be described in detail below, positive-side cell group 6a and negative-side cell group 6b are without being used for control of a circulating current but are used only for control of an AC electric quantity and a DC electric quantity. Positive-side cell group 6c and negative-side cell group 6d are used for control of a circulating current. Control of a circulating current is characterized in that only at least one cell constituting each leg circuit 8 is used therefor.

The power conversion device in FIG. 1 further includes an AC voltage detector 10, DC voltage detectors 11a and 11b, and arm current detectors 9a and 9b provided in each leg circuit 8 as detectors which detect electric quantities (a current and a voltage) used for control. Signals detected by these detectors are input to control device 5.

Specifically, AC voltage detector 10 detects a U-phase voltage value Vacu, a V-phase voltage value Vacv, and a W-phase voltage value Vacw of AC circuit 2. DC voltage detector 11a detects a voltage of positive-side DC terminal Np connected to DC circuit 4. DC voltage detector 11b detects a voltage of negative-side DC terminal Nn connected to DC circuit 4. Arm current detectors 9a and 9b provided in leg circuit 8a for the U phase detect an arm current Ipu which flows in positive-side atm 13 and an arm current Inu which flows in negative-side arm 14, respectively. Similarly, arm current detectors 9a and 9b provided in leg circuit 8b for the V phase detect a positive-side arm current Ipv and a negative-side arm current Inv, respectively. Arm current detectors 9a and 9b provided in leg circuit 8c for the W phase detect a positive-side arm current Ipw and a negative-side arm current Inw, respectively. Arm currents Ipu, Inu, Ipv, Inv, Ipw, and Inw which flow from positive-side DC terminal Np toward negative-side DC terminal Nn are defined as positive currents.

Configuration Example of Converter Cell

Figure 2:
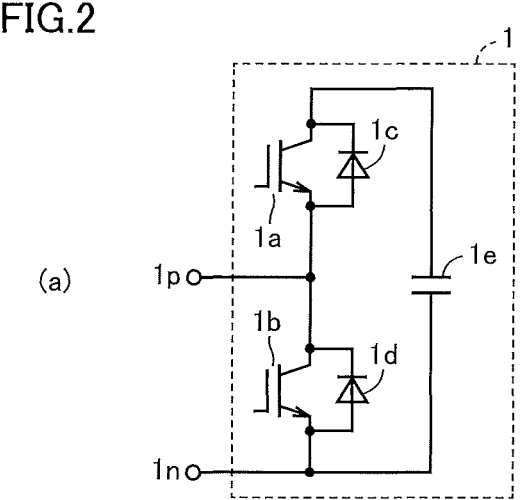
FIG. 2 is a circuit diagram showing one example of a converter cell constituting a cell group.
Figure 2:
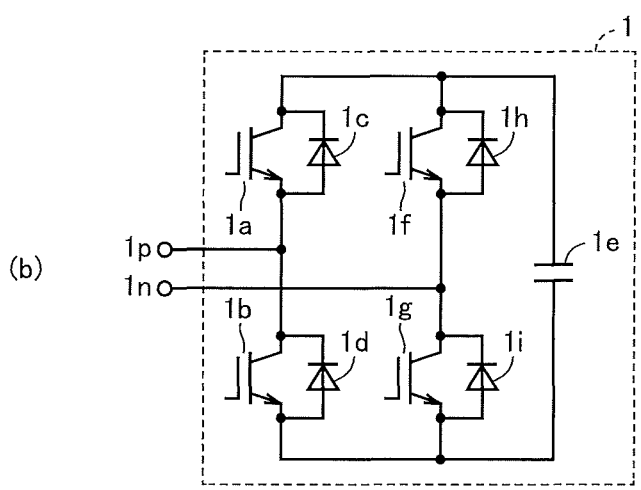
Figure 2:
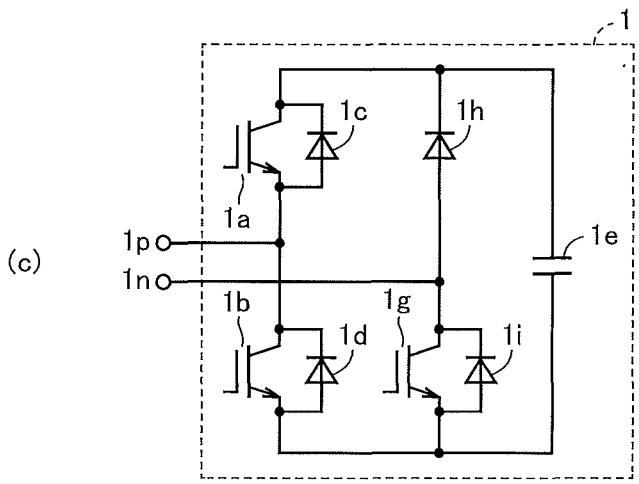

FIG. 2 is a circuit diagram showing one example of a converter cell constituting cell groups 6a, 6b, 6c, and 6d. Converter cell 1 shown in FIG. 2 (a) adopts a half bridge configuration and includes semiconductor switching elements 1a and 1b (which may hereinafter simply be referred to as a switching element) connected in series to each other, diodes 1c and 1d, and a DC capacitor 1e as an energy storage. Diodes 1c and 1d are connected in anti-parallel (in parallel and in a direction of a reverse bias) to switching elements 1a and 1b, respectively. DC capacitor 1e is connected in parallel to a series connection circuit of switching elements 1a and 1b and smoothes a DC voltage. A connection node between switching elements 1a and 1b is connected to a positive-side input and output terminal 1p and a connection node between switching element 1b and DC capacitor 1e is connected to a negative-side input and output terminal 1n.

In the configuration in FIG. 2 (a), switching elements 1a and 1b are controlled such that one is turned on and the other is turned off. When switching element 1a is turned on and switching element 1b is turned off, a voltage across opposing ends of DC capacitor 1e is applied across input and output terminals 1p and 1n (a positive-side voltage being applied to input and output terminal 1p and a negative-side voltage being applied to input and output terminal 1n). In contrast, when switching element 1a is turned off and switching element 1b is turned on, 0 V is applied across input and output terminals 1p and 1n. Converter cell 1 shown in FIG. 2 (a) can output a zero voltage or a positive voltage (dependent on a voltage of DC capacitor 1e) by alternately turning on switching elements 1a and 1b. Diodes 1c and 1d are provided for protection when voltages in reverse directions are applied to switching elements 1a and 1b.

Converter cell 1 shown in FIG. 2 (b) adopts a full bridge configuration and it is different from converter cell 1 in FIG. 2 (a) in further including switching elements 1f and 1g connected in series and diodes 1h and 1i connected in anti-parallel to switching elements 1f and 1g. Switching elements 1f and 1g as a whole are connected in parallel to the series connection circuit of switching elements 1a and 1b and connected in parallel to DC capacitor 1e. Input and output terminal 1p is connected to the connection node between switching elements 1a and 1b and input and output terminal 1n is connected to a connection node between switching elements 1f and 1 g.

Converter cell 1 shown in FIG. 2 (b) is controlled such that switching element 1g is normally turned on, switching element 1f is normally turned off, and switching elements 1a and 1b are alternately turned on during a normal operation (that is, a zero voltage or a positive voltage is output across input and output terminals 1p and 1n). Converter cell 1 shown in FIG. 2 (b), however, can also output a zero voltage or a negative voltage by turning off switching element 1g, turning on switching element 1f, and alternately turning on switching elements 1a and 1b.

Converter cell 1 shown in FIG. 2 (c) is configured with switching element 1f having been removed from converter cell 1 of the full bridge configuration as shown in FIG. 2 (b) and it is otherwise the same as in FIG. 2 (b). Converter cell 1 in FIG. 2 (c) is controlled such that switching element 1g is normally turned on and switching elements 1a and 1b are alternately turned on during the normal operation (that is, a zero voltage or a positive voltage is output across input and output terminals 1p and 1n). Converter cell 1 shown in FIG. 2 (c) can output a negative voltage when switching elements 1a and 1g are turned off and switching element 1b is turned on so that a current flows from input and output terminal 1n toward input and output terminal 1p.

A self-turn-off switching element capable of control of both of an on operation and an off operation is employed for each of switching elements 1a, 1b, 1f, and 1g. For example, an insulated gate bipolar transistor (IGBT) or a gate commutated turn-off thyristor (GCT) is employed as switching elements 1a, 1b, 1f, and 1g.

[Configuration and General Operation of Control Device]

Figure 3:
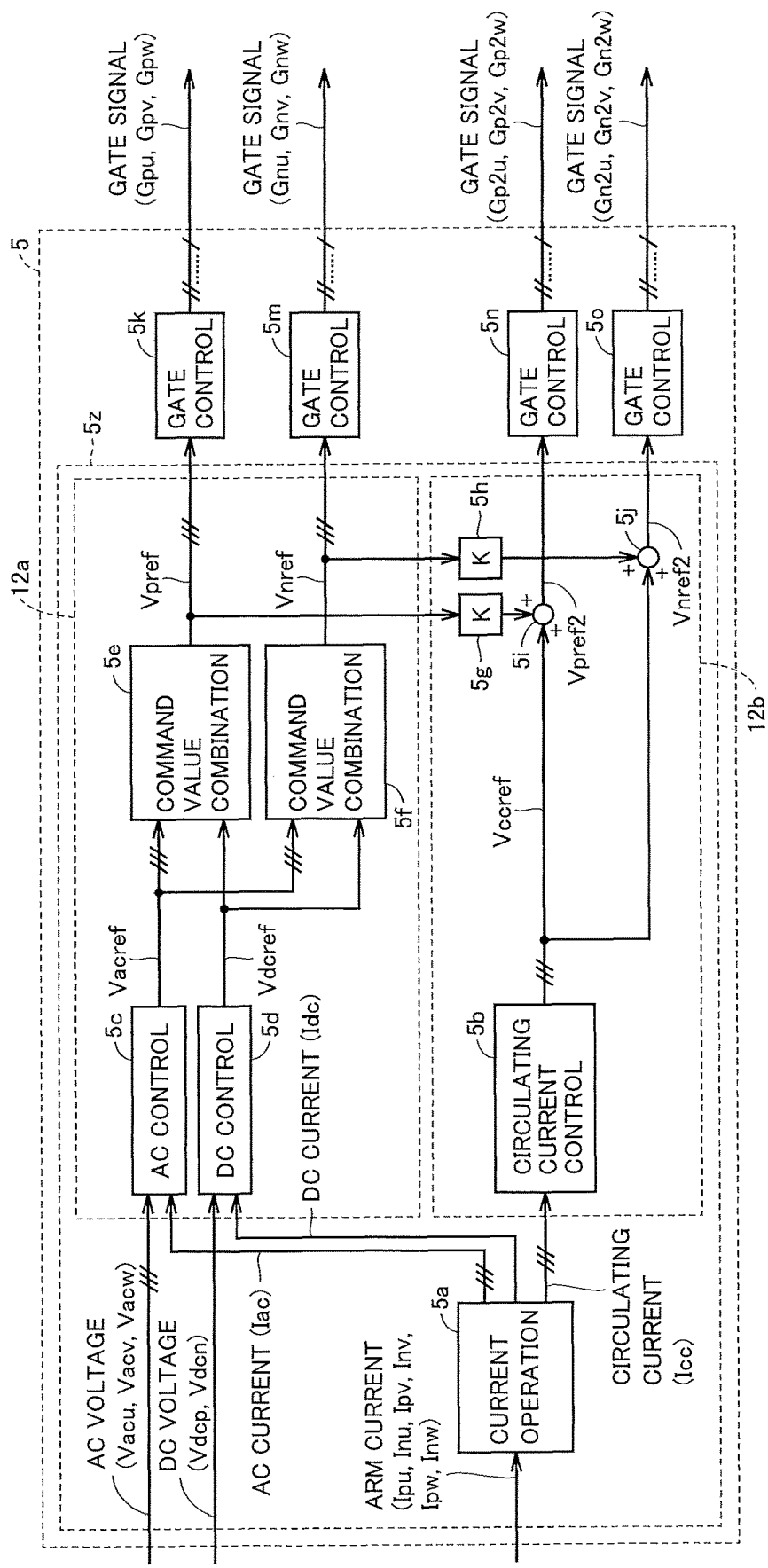
FIG. 3 is a configuration diagram of a control device in FIG. 1.

FIG. 3 is a configuration diagram of control device 5 in FIG. 1. Control device 5 shown in FIG. 3 may be configured with a dedicated circuit or configured in part or in its entirety with a field programmable gate array (FPGA) and/or a microprocessor. A configuration of control device 5 and a general operation of each element will be described below with reference to FIGS. 1 and 3.

Control device 5 includes a voltage command value generation portion 5z and gate control portions 5k, 5m, 5n, and 5o. Gate control portion 5k supplies gate signals Gpu, Gpv, and Gpw to each switching element constituting positive-side cell group 6a of leg circuits 8a, 8b, and 8c, respectively. Gate control portion 5m supplies gate signals Gnu, Gnv, and Gnw to each switching element constituting negative-side cell group 6b of leg circuits 8a, 8b, and 8c, respectively. Gate control portion 5n supplies gate signals Gp2u, Gp2v, and Gp2w to each switching element constituting positive-side cell group 6c for control of a circulating current of leg circuits 8a, 8b, and 8c, respectively. Gate control portion 5o supplies gate signals Gn2u, Gn2v, and Gn2w to each switching element constituting negative-side cell group 6d for control of a circulating current of leg circuit 8a, 8b, and 8c, respectively.

Voltage command value generation portion 5z supplies voltage command values Vpref, Vnref, Vpref2, and Vnref2 to gate control portions 5k, 5m, 5n, and 5o, respectively. Voltage command values Vpref2 and Vnref2 supplied to respective gate control portions 5n and 5o for control of a circulating current are based on a detection value of a circulating current Icc. Voltage command values Vpref and Vnref supplied to other gate control portions 5k and 5m are not based on a detection value of circulating current Icc.

More specifically, voltage command value generation portion 5z includes a current operation portion 5a, a circulating current control portion 5b, an AC control portion 5c, a DC control portion 5d, command value combination portions 5e and 5f, gain circuits 5g and 5h, and adders 5i and 5j.

Current operation portion 5a takes in positive-side arm currents Ipu, Ipv, and Ipw detected by current detector 9a provided in positive-side arm 13 of leg circuit 8 of each phase and negative-side arm currents Inu, Inv, and Inw detected by current detector 9b provided in negative-side arm 14 of leg circuit 8 of each phase. Current operation portion 5a operates AC current values Iacu, Iacv, and Iacw, a DC current value Idc, and circulating current values Iccu, Iccv, and Iccw from the arm current which has been taken in. Current operation portion 5a outputs calculated AC current values Iacu, Iacv, and Iacw to AC control portion 5c, outputs calculated DC current value Idc to DC control portion 5d, and outputs calculated circulating current values Iccu, Iccv, and Iccw to circulating current control portion 5b.

U-phase AC current Iacu, V-phase AC current Iacv, and W-phase AC current Iacw (which are denoted as an AC current Iac when they are collectively referred to) which flow from AC terminals Nu, Nv, and Nw of each leg circuit 8 toward transformer 3 are defined as positive. DC current Idc which flows from DC circuit 4 toward positive-side DC terminal Np and from negative-side DC terminal Nn toward DC circuit 4 is defined as positive. Circulating currents Iccu, Iccv, and Iccw which flow through leg circuits 8a, 8b, and 8c, respectively (which are denoted as circulating current Icc when they are collectively referred to) from positive-side DC terminal Np toward negative-side DC terminal Nn are defined as positive.

AC voltage values Vacu, Vacv, and Vacw of the U phase, the V phase and the W phase (which are denoted as an AC voltage value Vac when they are collectively referred to) detected by AC voltage detector 10 are further input to AC control portion 5c. AC control portion 5c generates AC voltage command values Vacrefu, Vacrefv, and Vacrefw of the U phase, the V phase, and the W phase (which are denoted as an AC voltage command value Vacref when they are collectively referred to) based on input AC current value Iac and AC voltage value Vac.

DC voltage values Vdcp and Vdcn detected by DC voltage detectors 11a and 11b are further input to DC control portion 5d. DC control portion 5d generates a DC voltage command value Vdcref based on input DC voltage values Vdcp and Vdcn and DC current value Idc.

Command value combination portion 5e generates a voltage command value Vprefu for U-phase positive-side cell group 6a by combining U-phase AC voltage command value Vacrefu and DC voltage command value Vdcref with each other. Similarly, command value combination portion 5e generates a voltage command value Vprefv for V-phase positive-side cell group 6a by combining V-phase AC voltage command value Vacrefv and DC voltage command value Vdcref with each other. Command value combination portion 5e further generates a voltage command value Vprefw for W-phase positive-side cell group 6a by combining W-phase AC voltage command value Vacrefw and DC voltage command value Vdcref with each other. Generated voltage command values Vprefu, Vprefv, and Vprefw (which are denoted as voltage command value Vpref when they are collectively referred to or an unspecified voltage command value is referred to) is input to gate control portion 5k.

Command value combination portion 5f generates a voltage command value Vnrefu for U-phase negative-side cell group 6b by combining U-phase AC voltage command value Vacrefu and DC voltage command value Vdcref with each other. Similarly, command value combination portion 5f generates a voltage command value Vnrefv for V-phase negative-side cell group 6b by combining V-phase AC voltage command value Vacrefv and DC voltage command value Vdcref with each other. Command value combination portion 5f further generates a voltage command value Vnrefw for W-phase negative-side cell group 6b by combining W-phase AC voltage command value Vacrefw and DC voltage command value Vdcref with each other. Generated voltage command values Vnrefu, Vnrefv, and Vnrefw (which are denoted as voltage command value Vnref when they are collectively referred to or an unspecified voltage command value is referred to) are input to gate control portion 5m.

Circulating current control portion 5b generates voltage command values Vccrefu, Vccrefv, and Vccrefw (which are denoted as a voltage command value Vccref when they are collectively referred to or an unspecified voltage command value is referred to) for control of a circulating current of each phase based on respective circulating current values Iccu, Iccv, and Iccw. Generated voltage command value Vccref for control of a circulating current of each phase is added in adder 5i for each phase to voltage command value Vpref for positive-side cell group 6a which has been multiplied by a gain K. Consequently, a voltage command value Vpref2 for positive-side cell group 6c for control of a circulating current is generated and generated voltage command value Vpref2 is supplied to gate control portion 5n. Similarly, generated voltage command value Vccref for control of a circulating current of each phase is added in adder 5j for each phase to voltage command value Vnref for negative-side cell group 6b which has been multiplied by gain K. Consequently, voltage command value Vnref2 for negative-side cell group 6d for control of a circulating current is generated and generated voltage command value Vnref2 is supplied to gate control portion 5o.

[Detailed Operation of Control Device 5]

A detailed operation of control device 5 will now be described.

(Operation of Current Operation Portion 5a)

Referring to FIG. 1, a point of connection between positive-side arm 13 and negative-side arm 14a of leg circuit 8a of the U phase is AC terminal Nu, which is connected to transformer 3. Therefore, AC current Iacu which flows from AC terminal Nu toward transformer 3 is equal to a current value calculated by subtracting value Ipn of a current which flows through negative-side arm 14 measured with current detector 9b from value Ipu of a current which flows through positive-side arm 13 measured with current detector 9a, that is, $$Iacu=Ipu-Inu \qquad (1).$$

An average value of current Ipu which flows through positive-side arm 13 and current Inu which flows through negative-side arm 14 is defined as a common current Icomu which flows through both of arms 13 and 14. Common current Icomu is a leg current which flows through a DC terminal of leg circuit 8a. Leg current Icomu can be operated as $$Icomu=(Ipu+Inu)/2 \qquad (2).$$

Similarly for the V phase and the W phase, V-phase AC current Iacv and a V-phase leg current Icomv can be calculated with V-phase positive-side arm current Ipv and V-phase negative-side arm current Inv, and W-phase AC current Iacw and a W-phase leg current Icomw can be calculated with W-phase positive-side arm current Ipw and W-phase negative-side arm current Inw. Specifically, they are expressed in expressions below.

$$Iacv = Ipv - Inv \quad (3)$$

$$Icomv = (Ipv + Inv)/2 \quad (4)$$

$$Iacw = Ipw - Inw \quad (5)$$

$$Icomw = (Ipw + Inw)/2 \quad (6)$$

DC terminals on the positive side of leg circuits 8a, 8b, and 8c of respective phases are connected in common as positive-side DC terminal Np, and DC terminals on the negative side are connected in common as negative-side DC terminal Nn. According to this configuration, a current value calculated by adding leg currents Icomu, Icomv, and Icomw of respective phases is represented as DC current Idc which flows in from the positive-side terminal of DC circuit 4 and returns to DC circuit 4 through the negative-side terminal. Therefore, DC current Idc can be operated as $$Idc = Icomu + Icomv + Icomw \quad (7).$$

Uniform allocation of a DC current component contained in the leg current among the phases is appropriate because a current capacity of the cell can be uniform. Taking into account this fact, a difference between a leg current and ⅓ of a DC current value can be operated as a value of a circulating current which does not flow in DC circuit 4 but flows through the legs of the respective phases. Specifically, circulating currents Iccu, Iccv, and Iccw of the U phase, the V phase, and the W phase can be operated as $$Iccu = Icomu - Idc/3 \quad (8)$$

$$Iccv = Icomv - Idc/3 \quad (9)$$

$$Iccw = Icomw - Idc/3 \quad (10).$$

Current operation portion 5a in FIG. 3 operates AC current values Iacu, Iacv, and Iacw, DC current value Idc, and circulating current values Iccu, Iccv, and Iccw from arm current values Ipu, Inu, Ipv, Inv, Ipw, and Inw detected by current detectors 9a and 9b in accordance with the expressions (1), (3), (5), and (7) to (10). Current operation portion 5a outputs calculated AC current values Iacu, Iacv, and Iacw, DC current value Idc, and circulating current values Iccu, Iccv, and Iccw to AC control portion 5c, DC control portion 5d, and circulating current control portion 5b, respectively.

(Operation of AC Control Portion 5c)

AC control portion 5c outputs an AC voltage to be output from each converter cell 1 implementing the power conversion device as AC voltage command values Vacrefu, Vacrefv, and Vacrefw, based on AC voltage values Vacu, Vacv, and Vacw detected by AC voltage detector 10 and AC current values Iacu, Iacv, and Iacw output from current operation portion 5a.

In AC control portion 5c, for example, an AC current controller which carries out feedback control such that an AC current value matches with an AC current command value and/or an AC voltage controller which carries out feedback control such that an AC voltage value matches with an AC voltage command value is/are configured in accordance with a function required in the power conversion device. Alternatively, a power controller which calculates power based on an AC current value and an AC voltage value and subjects power to feedback control such that a value thereof attains to a desired value is implemented. In actual, one of the AC current controller, the AC voltage controller, and the power controller or a plurality of them as combined implement(s) AC control portion 5c for operation.

Since the AC current controller controls a current output to AC circuit 2 with transformer 3 being interposed, a voltage component for controlling the current is a component which has been known as a normal-phase component and a reverse-phase component of a multi-phase AC voltage or a normal mode component. The AC voltage controller also similarly outputs a normal-phase component and a reverse-phase component to AC circuit 2 with transformer 3 being interposed.

When an AC multi-phase voltage is output to AC circuit 2, output of a voltage component in common among the three phases which is known as a zero-phase component or a common mode component to AC circuit 2 in addition to these normal-phase and reverse-phase components is also required. For example, it has been known that an AC component of a fundamental wave which can be output from a converter cell can be increased by approximately 15% by superimposing a third-order harmonic of the fundamental wave on a zero-phase component.

An effect below is further obtained by outputting a certain zero-phase component. Specifically, in the power conversion device configured in FIG. 1, an AC voltage component output from positive-side cell group 6a and an AC voltage component output from negative-side cell group 6b are opposite in polarity to each other and a DC voltage component output from positive-side cell group 6a and a DC voltage component output from negative-side cell group 6b are identical in polarity to each other as will be described later. Therefore, when a certain zero-phase component is contained in the AC voltage component, the zero-phase component is superimposed in a direction reverse in terms of positive and negative on the DC voltage component output from positive-side cell group 6a and the DC voltage component output from negative-side cell group 6b. Consequently, a difference between DC power output from positive-side cell group 6a and DC power output from negative-side cell group 6b is produced, and therefore energy stored in DC capacitor 1e contained in each converter cell 1 can be exchanged between positive-side cell group 6a and negative-side cell group 6b. A voltage value of DC capacitor 1e of each cell constituting positive-side cell group 6a can thus be balanced with a voltage value of DC capacitor 1e of each cell constituting negative-side cell group 6b, and the zero-phase voltage can be used for such control of balance.

(Operation of DC Control Portion 5d)

DC control portion 5d operates voltage value Vdc across DC ten Ana's based on a differential voltage between DC voltage values Vdcp and Vdcn detected by DC voltage detectors 11a and 11b. Voltage value Vdc across the DC terminals is given as $$Vdc = Vdcp - Vdcn \quad (11).$$

DC control portion 5d generates as DC voltage command value Vdcref, a DC voltage to be output from cell 1 based on calculated voltage value Vdc across the DC terminals and DC current value Idc output from current operation portion 5a, and outputs the DC voltage command value.

DC control portion 5d is implemented, for example, by any one of a DC current controller which controls a DC current value, a DC voltage controller which controls a DC voltage, and a DC power controller which controls DC power, or a plurality of them as being combined for operation, similarly to AC control portion 5c. A DC voltage component output from positive-side cell group 6a and a DC voltage component output from negative-side cell group 6b in accordance with DC voltage command value Vdcref output from the DC voltage controller, the DC current controller, and the DC power controller are identical in polarity to each other as will be described later. Since cell groups 6a and 6b are connected in series, output voltages from cell groups 6a and 6b are combined and the combined voltage is defined as a voltage component generated across the positive-side DC terminal and the negative-side DC terminal of leg circuit 8. Since DC voltage command value Vdcref is provided to gate control portions 5k and 5m as a component common among the phases in the configuration of control device 5 shown in FIG. 3, the voltage components output from cell groups 6a and 6b in accordance with DC voltage command value Vdcref result in a DC voltage component output to DC circuit 4.

Unlike the above, DC control portion 5d can also be configured to provide DC voltage command values Vdcref different in magnitude among the phases. In that case, a DC voltage command value is provided such that a circulating current which circulates among the phases flows based on a potential difference produced in reactors 7a and 7b. When a DC circulating current flows, a difference is produced in DC power generated by leg circuits 8a, 8b, and 8c and consequently a difference in energy stored in DC capacitor 1e constituting cell groups 6a and 6b is also produced among the phases. This operation is applied to balance control for balancing among the phases in connection with a DC voltage of DC capacitor 1e.

(Operation of Command Value Combination Portions 5e and 5f)

Command value combination portion 5e operates a voltage to be output from positive-side cell group 6a as voltage command value Vpref (Vprefu, Vprefv, and Vprefw). Command value combination portion 5f operates a voltage to be output from negative-side cell group 6b as voltage command value Vnref (Vnrefu, Vnrefv, and Vnrefw). Voltage command values Vpref and Vnref are obtained by combining DC voltage command value Vdcref and AC voltage command value Vacref with each other for each phase.

Specifically, positive-side cell group 6a and negative-side cell group 6b are connected in series between DC terminals Np and Nn connected to DC circuit 4. Therefore, in calculating each of voltage command value Vpref of positive-side cell group 6a and voltage command value Vnref of negative-side cell group 6b, ½ of DC voltage command value Vdcref is combined by addition.

Since AC terminals Nu, Nv, and Nw are located at points of connection between positive-side arm 13 and negative-side arm 14, AC voltage command value Vacref is combined by subtraction in calculating voltage command value Vpref of positive-side cell group 6a, and AC voltage command value Vacref is combined by addition in calculating voltage command value Vnref of negative-side cell group 6b. For example, in leg circuit 8a in FIG. 1, when positive-side cell group 6a outputs an AC voltage relatively small in value and negative-side cell group 6b outputs an AC voltage relatively great in value, a potential of AC terminal Nu is closer to a potential of positive-side DC terminal Np and a high voltage is output to AC terminal Nu. Negative-side cell group 6b outputs an AC voltage identical in polarity to an AC voltage to be output from AC terminal Nu, and positive-side cell group 6a outputs an AC voltage opposite in polarity to an AC voltage to be output from AC terminal Nu.

In the power conversion device in the first embodiment, command value combination portions 5e and 5f combine normal- and reverse-phase components and a zero-phase component contained in AC voltage command value Vacref with DC voltage command value Vdcref through the operation above, however, they do not combine a voltage component with which energy is balanced among the phases by feeding a circulating current nor a voltage component with which a circulating current is controlled.

(Operation of Gate Control Portions 5k and 5m)

Gate control portion 5k provides corresponding gate signals Gpu, Gpv, and Gpw to the switching element of cell 1 constituting positive-side cell group 6a of each phase based on voltage command values Vprefu, Vprefv, and Vprefw of the U phase, the V phase, and the W phase combined by command value combination portion 5e. Gate control portion 5m provides corresponding gate signals Gnu, Gnv, and Gnw to the switching element of cell 1 constituting negative-side cell group 6b of each phase based on voltage command values Vnrefu, Vnrefv, and Vnrefw of the U phase, the V phase, and the W phase combined by command value combination portion 5f.

As described already, in half bridge cell 1 shown in FIG. 2 (a), switching element 1a is turned on and switching element 1b is turned off when a voltage of DC capacitor 1e is output. When a zero voltage is output, in contrast, switching element 1a is turned off and switching element 1b is turned on. A pulse width modulation (PWM) scheme has thus been known as a scheme for controlling a converter which can output a binary voltage level.

Under the pulse width modulation scheme, a pulse width of a gate signal supplied to a switching element is controlled such that a DC component of a desired voltage or an AC component of a fundamental wave can be output in a time average manner. By making pulses from a plurality of converters different in timing, a voltage less in harmonic component can be supplied as a combined voltage. For example, a method of determining timing of switching at a point of intersection between signals based on comparison of a triangular wave or a saw tooth wave of a fixed frequency with a voltage command value has been known.

(Operation of Circulating Current Control Portion 5b)

Circulating current values Iccu, Iccv, and Iccw of the U phase, the V phase, and the W phase operated by current operation portion 5a are sent to circulating current control portion 5b. Circulating current control portion 5b subjects the circulating current value to feedback control such that the circulating current value matches with a circulating current command value. Circulating current control portion 5b is provided with a compensator which amplifies a difference between a circulating current command value and a circulating current value. Though a zero current is normally provided as a circulating current command value, a non-zero value may also be provided when imbalance occurs in a power system. Circulating current control portion 5b outputs a voltage component to be output by cell groups 6c and 6d for control of a circulating current as voltage command value Vccref (Vccrefu for the U phase, Vccrefv for the V phase, and Vccrefw for the W phase).

The circulating current flows through legs of different phases. Cell groups 6a and 6b and reactors 7a and 7b are present in a path for the circulating current and a circulating current is produced by application of a potential difference produced by switching of cell groups 6a and 6b to reactors 7a and 7b. Therefore, a circulating current is suppressed by application of a voltage opposite in polarity to the reactors by cell groups 6c and 6d provided in the same path.

For example, when circulating current Iccu flows from the positive-side DC terminal toward the negative-side DC terminal of leg circuit 8a and when a positive voltage is output from each of cell groups 6c and 6d of leg circuit 8a, a voltage in a direction of lowering in circulating current is applied to reactors 7a and 7b. When a current flows in a direction reverse to the above, a circulating current can be attenuated by applying a voltage from cell groups 6c and 6d also in the reverse direction. Therefore, circulating current control portion 5b carries out feedback control by using a compensator which amplifies a difference between the circulating current command value and the circulating current value.

(Operation of Adders 5i and 5j)

Adder 5i adds for each phase, voltage command value Vccref for control of a circulating current output from circulating current control portion 5b (Vccrefu for the U phase, Vccrefv for the V phase, and Vccrefw for the W phase) and a value calculated by multiplying voltage command value Vpref for positive-side cell group 6a (Vprefu for the U phase, Vprefv for the V phase, and Vprefw for the W phase) by gain K by gain circuit 5g to each other. A result of addition by adder 5i is input to gate control portion 5n as voltage command value Vpref2 (Vpref2u for the U phase, Vpref2v for the V phase, and Vpref2w for the W phase) representing a voltage component to be output from positive-side cell group 6c for control of a circulating current.

Similarly, adder 5j adds for each phase, voltage command value Vccref for control of a circulating current output from circulating current control portion 5b (Vccrefu for the U phase, Vccrefv for the V phase, and Vccrefw for the W phase) and a value calculated by multiplying voltage command value Vnref for negative-side cell group 6b (Vnrefu for the U phase, Vnrefv for the V phase, and Vnrefw for the W phase) by gain K by gain circuit 5h to each other. A result of addition by adder 5j is input to gate control portion 5o as voltage command value Vnref2 (Vnref2u for the U phase, Vnref2v for the V phase, and Vnref2w for the W phase) representing a voltage component to be output from negative-side cell group 6d for control of a circulating current.

The reason for addition of a voltage command value in adders 5i and 5j is that a half bridge type shown in FIG. 2 (a) is employed for converter cell 1 constituting cell groups 6c and 6d for control of a circulating current. The cell of the half bridge type can output only a zero voltage or a positive voltage. Therefore, in order to increase or decrease an output voltage from converter cell 1 in accordance with increase or decrease in circulating current, the output voltage should be increased or decreased with a certain voltage value being defined as a reference. When a voltage defined as the reference is fixed to a constant value, however, capacitor 1e is undesirably kept charged with DC current Idc which flows between DC circuit 4 and leg circuit 8. In order to avoid this problem, voltage command values Vpref and Vnref for cell groups 6a and 6b multiplied by K, being defined as reference voltages, are added to voltage command values Vpref2 and Vnref2 for cell groups 6c and 6d for control of a circulating current, respectively. A voltage of capacitor 1e of each converter cell 1 constituting cell groups 6c and 6d can thus be kept at a constant value.

(Operation of Gate Control Portions 5n and 5o)

Gate control portion 5n provides corresponding gate signals Gp2u, Gp2v, and Gp2w to the switching element of cell 1 constituting positive-side cell group 6c of the corresponding phase based on voltage command values Vpref2u, Vpref2v, and Vpref2w of the U phase, the V phase, and the W phase output from adder 5i. Gate control portion 5o provides corresponding gate signals Gn2u, Gn2v, and Gn2w to the switching element of cell 1 constituting negative-side cell group 6d of each phase based on voltage command values Vnref2u, Vnref2v, and Vnref2w of the U phase, the V phase, and the W phase output from adder 5j. Gate control portions 5n and 5o can be operated under a pulse width modulation scheme similarly to gate control portions 5k and 5m.

[As to Voltage Command Value Provided to Cell Groups 6c and 6d for Control of Circulating Current]

In a circuit scheme of the power conversion device shown in FIGS. 1 and 2, each converter cell 1 has been known to be controlled such that energy which flows in and out of DC capacitor 1e is substantially zero. In order to achieve this, a command value for AC control and a command value for DC control are provided to each converter cell 1 such that AC power which flows in and DC power which flows out match with each other or AC power which flows out and DC power which flows in match with each other, which means that, when each converter cell 1 constituting positive-side cell group 6a is controlled with voltage command value Vpref, active power which flows in or out of each converter cell 1 is substantially zero under a current condition at that time (magnitude and a phase of an AC current, a DC current, and a circulating current).

Therefore, even though a signal in proportion to voltage command value Vpref for positive-side cell group 6a is provided to positive-side cell group 6c for control of a circulating current, positive-side cell group 6a and positive-side cell group 6c are equal to each other in current condition and therefore active power which flows in or out of each converter cell 1 constituting positive-side cell group 6c can be substantially 0. Since voltage command value Vpref2 for control of a circulating current provided to positive-side cell group 6c serves for control of a voltage to be applied at reactors 7a and 7b, power which flows in or out of each cell 1 constituting positive-side cell group 6c based on voltage command value Vpref2 is mainly composed of reactive power. This is also applicable to negative-side cell group 6d for control of a circulating current. Essentially, cell groups 6c and 6d for control of a circulating current have to output substantially no active power.

As described already, when converter cell 1 configured as a half bridge shown in FIG. 2 (a) is employed in cell groups 6c and 6d for control of a circulating current, a control signal should be added in adders 5i and 5j. The circulating current which flows through each leg circuit 8 has positive and negative polarities, whereas converter cell 1 configured as the half bridge can output only a zero voltage or a positive voltage (a voltage value of the capacitor), and hence such an unfavorable condition should be avoided. Therefore, by superimposing a DC-like bias signal on a control signal, converter cell 1 configured as the half bridge is permitted to output an output voltage in accordance with a circulating current of both polarities. In the power conversion device configured in FIG. 1, however, a DC current Id flows between leg circuits 8a, 8b, and 8c and DC circuit 4. Therefore, when a bias signal has a constant value, active power is generated in converter cell 1 and hence it becomes difficult to maintain a voltage of DC capacitor 1e of converter cell 1 constant. Separately providing a power supply in parallel to DC capacitor 1e or replacement of DC capacitor 1e with a power supply undesirably complicates a device configuration.

In the power conversion device in the first embodiment, a signal in proportion to voltage command value Vpref for positive-side cell group 6a (proportional gain K) is added as a bias value to voltage command value Vpref2 for positive-side cell group 6c and a signal in proportion to voltage command value Vnref for negative-side cell group 6b is added to voltage command value Vnref2 for negative-side cell group 6d as a bias value. Since AC power and DC power produced in converter cell 1 constituting cell groups 6c and 6d are thus balanced under a current condition corresponding to voltage command values Vpref and Vnref, a voltage of DC capacitor 1e of converter cell 1 can be kept constant. Proportional gain K is set to any such value as not saturating an output voltage from converter cell 1 when voltage command value Vccref for control of a circulating current is provided.

When converter cell 1 configured as a full bridge shown in FIG. 2 (b) constitutes each cell 1 of cell groups 6c and 6d for control of a circulating current, each cell 1 can output a voltage of both polarities and hence proportional gain K can also be set to 0.

Effect of First Embodiment

As set forth above, the power conversion device according to the first embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device. With cell groups 6a and 6b, an electric quantity of each of AC terminals Nu, Nv, and Nw and DC terminals Np and Nn can reliably be controlled without interference by control of a circulating current.

Furthermore, the power conversion device according to the first embodiment can control a value of a circulating current in accordance with a circulating current command value by including cell groups 6c and 6d for control of a circulating current. Voltage command value Vpref2 for positive-side cell group 6c is generated by adding a value in proportion to voltage command value Vpref for positive-side cell group 6a as a bias value to voltage command value Vccref for control of a circulating current (that is, by linear combination between voltage command value Vpref and voltage command value Vccref). Similarly, voltage command value Vpref2 for negative-side cell group 6d is generated by adding a value in proportion to voltage command value Vnref for negative-side cell group 6b as a bias value to voltage command value Vccref for control of a circulating current (that is, by linear combination between voltage command value Vnref and voltage command value Vccref). Since active power which flows in or out of converter cell 1 constituting cell groups 6c and 6d can thus be set to zero, a voltage of DC capacitor 1e of each cell in cell groups 6c and 6d can be maintained at a constant value.

[Modification]

In each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portion 5n, adder 5i, and gain circuit 5g associated therewith are not required either, which is advantageous in simplification of the configuration of control device 5. Similarly, when only reactor 7a on the positive side is provided, negative-side cell group 6d for control of a circulating current is not required and gate control portion 5o, adder 5j, and gain circuit 5h associated therewith are not required either, which is advantageous in simplification of the configuration of control device 5.

In the embodiment above, an example in which each cell 1 constituting cell groups 6a and 6b which are not for control of a circulating current and each cell 1 constituting cell groups 6c and 6d for control of a circulating current are identical in configuration is shown. Unlike this configuration, each cell constituting cell groups 6a and 6b and each cell constituting cell groups 6c and 6d may be different from each other in configuration. An effect the same as in the first embodiment described above is achieved also in this case.

In the embodiment above, voltage command values Vpref2 and Vnref2 for cell groups 6c and 6d are generated by addition of a signal in proportion to voltage command values Vpref and Vnref for cell groups 6a and 6b to voltage command value Vccref for control of a circulating current by adders 5i and 5j. Therefore, since a voltage component in proportion to voltage command values Vpref and Vnref for cell groups 6a and 6b is output also in cell groups 6c and 6d for control of a circulating current, an electric quantity of DC terminals Np and Nn and an electric quantity of AC terminals Nu, Nv, and Nw are affected. In order to correct such influence, a result of multiplication of voltage command values Vpref and Vnref by gain K and a correction coefficient in accordance with the number of cells in each of cell groups 6a, 6b, 6c, and 6d may be provided to gate control portions 5k and 5m.

As shown in FIG. 3, AC control portion 5c, DC control portion 5d, and command value combination portions 5e and 5f may be configured with a dedicated FPGA or microprocessor as a first control unit 12a and circulating current control portion 5b, gain circuits 5g and 5h, and adders 5i and 5j may be configured as a second control unit 12b with an FPGA or a microprocessor separate from first control unit 12a. By thus configuring control unit 12b for control of a circulating current and control unit 12a for other types of control separately from each other, voltage command value generation portion 5z can be configured with a plurality of inexpensive FPGAs or microprocessors without using an expensive FPGA or microprocessor high in operation capability.

Second Embodiment

[Configuration of Power Conversion Device]

Figure 4:
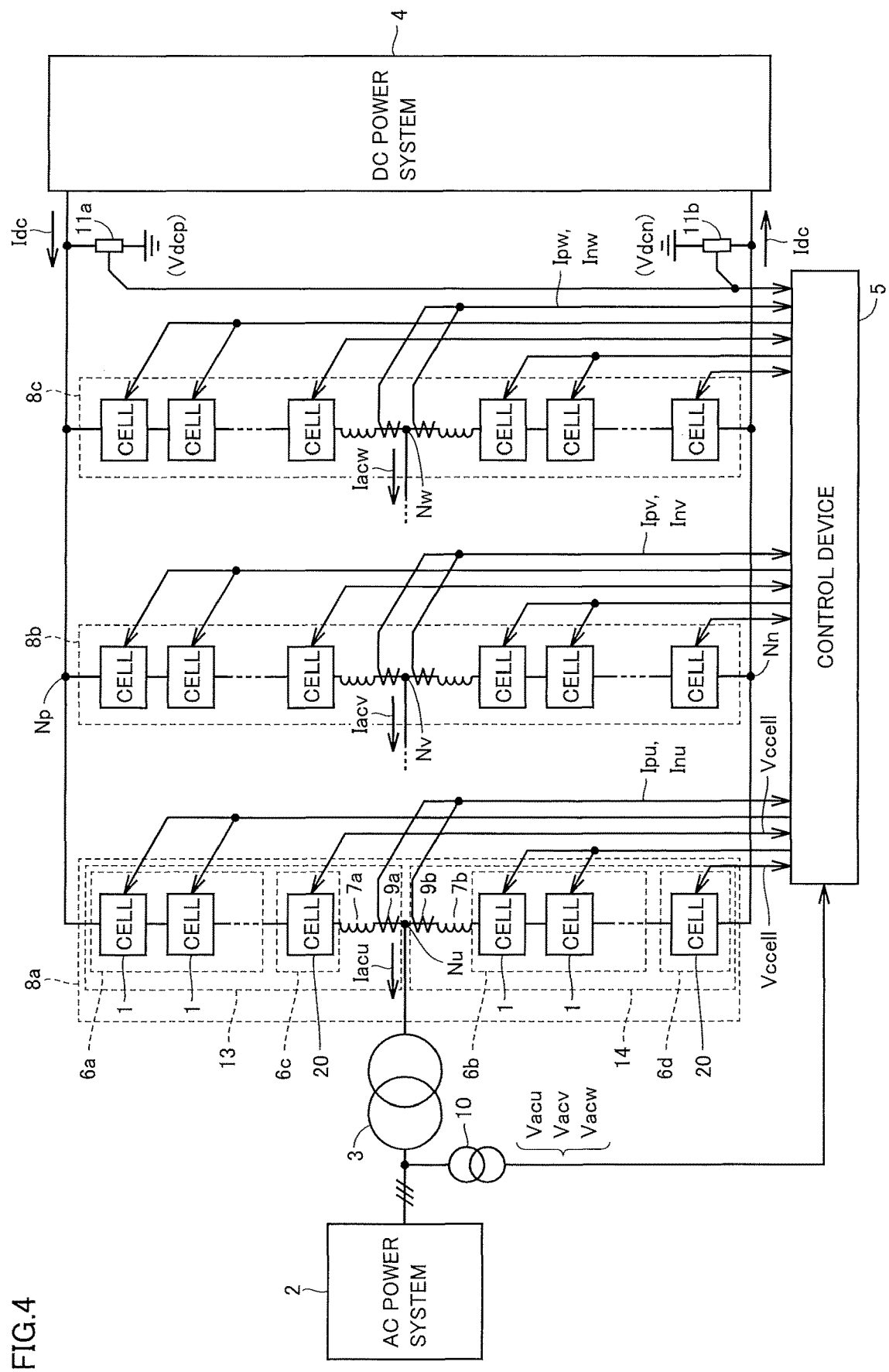
FIG. 4 is a schematic configuration diagram of a power conversion device according to a second embodiment.

FIG. 4 is a schematic configuration diagram of a power conversion device according to a second embodiment. The power conversion device in FIG. 4 is different from the power conversion device in FIG. 1 in configuration of each cell 20 provided in cell groups 6c and 6d for control of a circulating current. Specifically, each converter cell 20 provided in cell groups 6c and 6d in FIG. 4 is configured to detect a voltage of DC capacitor 1e (which is hereinafter referred to as a cell capacitor voltage Vccell) provided in the converter cell itself and to transmit a detection value to control device 5. Since FIG. 4 is otherwise the same in configuration as FIG. 1, description will not be repeated.

Figure 5:
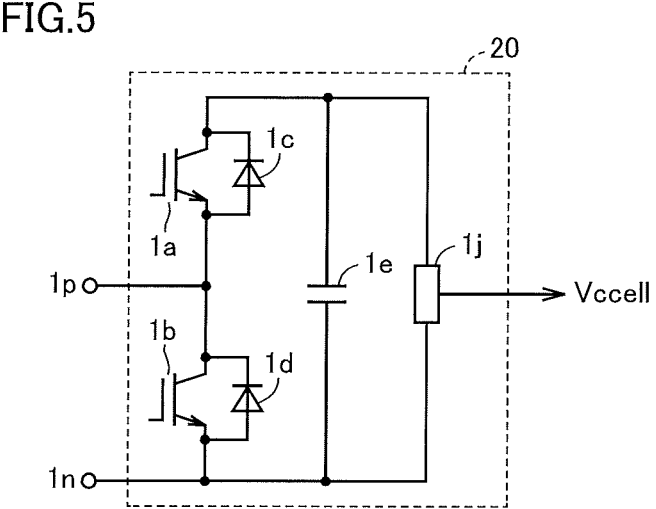
FIG. 5 is a circuit diagram showing a detailed configuration of each cell provided in a cell group for control of a circulating current.

FIG. 5 is a circuit diagram showing a detailed configuration of each cell 20 provided in cell groups 6c and 6d for control of a circulating current. FIG. 5 shows exemplary cell 20 of a half bridge type.

Referring to FIG. 5, converter cell 20 is different from converter cell 1 in FIG. 2 (a) in further including a DC voltage detector 1j provided in parallel to DC capacitor 1e. DC voltage detector 1j detects voltage Vccell of DC capacitor 1e and outputs detected cell capacitor voltage Vccell to control device 5.

Converter cell 20 may be configured as a full bridge in FIG. 2 (b) or may be configured with the configuration in FIG. 2 (c) being made use of. DC voltage detector 1j is provided in parallel to DC capacitor 1e also in these examples.

[Configuration of Control Device 5]

Figure 6:
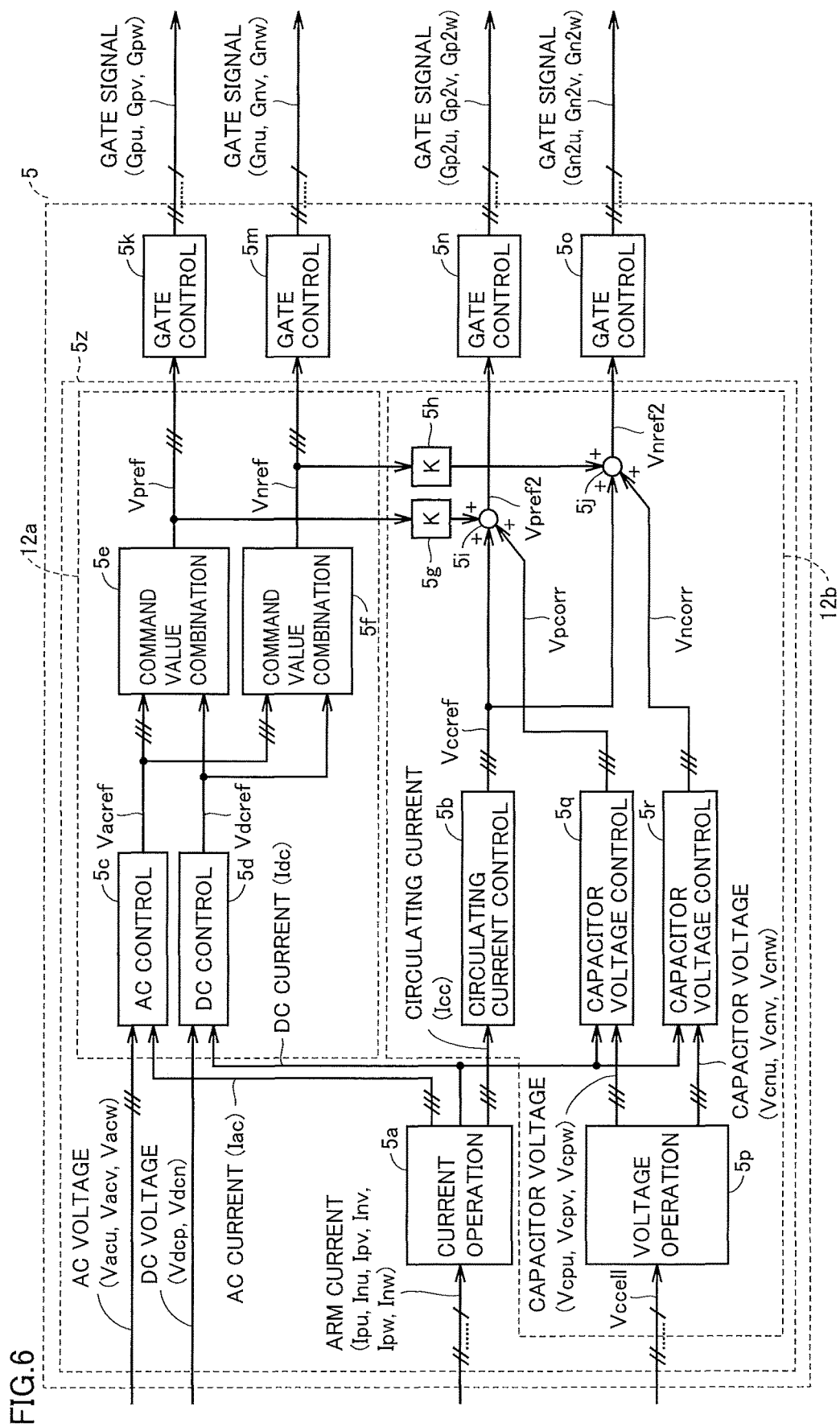
FIG. 6 is a configuration diagram of the control device in FIG. 4.

FIG. 6 is a configuration diagram of control device 5 in FIG. 4. Control device 5 shown in FIG. 6 is different from control device 5 in FIG. 3 in further including a voltage operation portion 5p and capacitor voltage control portions 5q and 5r. Since FIG. 6 is otherwise the same in configuration as FIG. 3, elements the same as those or elements corresponding to those in FIG. 3 have the same reference characters allotted and description may not be repeated below.

Voltage operation portion 5p receives information on cell capacitor voltage Vccell from each cell 20 provided in cell groups 6c and 6d of leg circuits 8a, 8b, and 8c of the respective phases shown in FIG. 4. Voltage operation portion 5p calculates a representative value Vcp (Vcpu of the U phase, Vcpv of the V phase, and Vcpw of the W phase) of a plurality of cell capacitor voltages of positive-side cell group 6c for each of the U phase, the V phase, and the W phase based on received information on cell capacitor voltage Vccell and calculates a representative value Vcn (Vcnu of the U phase, Vcnv of the V phase, and Vcnw of the W phase) of a plurality of cell capacitor voltages of negative-side cell group 6d. An average value, a median, a maximum value, or a minimum value of cell capacitor voltages Vccell of each cell group can be applied as appropriate to operation of the representative value. Voltage operation portion 5p outputs representative values Vcpu, Vcpv, and Vcpw of the cell capacitor voltages of each positive-side cell group 6c to capacitor voltage control portion 5q and representative values Vcnu, Vcnv, and Vcnw of the cell capacitor voltages of each negative-side cell group 6d to capacitor voltage control portion 5r.

Capacitor voltage control portion 5q receives information on DC current value Idc from current operation portion 5a and receives information on cell capacitor voltage values Vcpu, Vcpv, and Vcpw of positive-side cell group 6c from voltage operation portion 5p. Capacitor voltage control portion 5q generates a voltage correction value Vpcorr for correcting voltage command value Vpref2 for positive-side cell group 6c based on the received information and outputs generated voltage correction value Vpcorr to adder 5i.

Capacitor voltage control portion 5r receives information on DC current value Idc from current operation portion 5a and receives information on cell capacitor voltage values Vcnu, Vcnv, and Vcnw of negative-side cell group 6d from voltage operation portion 5p. Capacitor voltage control portion 5r generates a voltage correction value Vncorr for correcting voltage command value Vnref2 for negative-side cell group 6d based on the received information and outputs generated voltage correction value Vncorr to adder 5j.

[Detailed Operation of Control Device 5]

A detailed operation of control device 5 will now be described. Description of an operation in common to that in FIG. 3 in the first embodiment will not be repeated.

Since voltages output from cell groups 6c and 6d for control of a circulating current have a function to control a current which flows through reactors 7a and 7b, power output from cell groups 6c and 6d is substantially reactive power. When active power originating from a loss in reactors 7a and 7b is unignorable, however, active power should be supplied to cell groups 6c and 6d, because the method of providing to cell groups 6c and 6d, bias values in proportion to voltage command values Vpref and Vnref provided to cell groups 6a and 6b described in the first embodiment alone cannot maintain a voltage of DC capacitor 1e of cell groups 6c and 6d.

From a point of view above, in the power conversion device in FIGS. 4 and 6, voltage detector 1j detects a voltage of DC capacitor 1e of each cell 20 constituting each of cell groups 6c and 6d. Voltage operation portion 5p operates representative values Vcpu, Vcpv, Vcpw, Vcnu, Vcnv, and Vcnw of cell capacitor voltages Vcell (which are simply referred to as capacitor voltage values for the sake of brevity) of each of cell groups 6c and 6d. A compensator provided in each of capacitor voltage control portions 5q and 5r amplifies a difference between a capacitor voltage command value and a capacitor voltage value (that is, a command value−a voltage value) for each of cell groups 6c and 6d of each phase. Voltage control portions 5q and 5r output a result of multiplication of the amplified difference by a polarity (1 or −1) of DC current value Idc to adders 5i and 5j as voltage correction values Vpcorr and Vncorr for control of a circulating current.

Adder 5i adds voltage command value Vccref for control of a circulating current, a value in proportion to voltage command value Vpref for cell group 6a, and voltage correction value Vpcorr to one another. A result of addition is supplied to gate control portion 5n as voltage command value Vpref2 for cell group 6c. Adder 5j adds voltage command value Vccref for control of a circulating current, a value in proportion to voltage command value Vnref for cell group 6b, and voltage correction value Vncorr to one another. A result of addition is supplied to gate control portion 5o as voltage command value Vnref2 for cell group 6d.

According to the configuration, (i) when DC current value Idc is positive (polarity=1) and a capacitor voltage is smaller than a command value thereof, the compensator outputs a positive signal and therefore a voltage correction value for control of a circulating current serves as a signal having a positive DC component as a result of multiplication of the output from the compensator by the polarity (=1) of DC current Idc. With a signal of this voltage correction value, a period during which switching element 1a in FIG. 5 is conducting is longer and hence a period during which DC current Idc flows into DC capacitor 1e is longer. Consequently, DC capacitor 1e is charged, and therefore a difference between the capacitor voltage command value and a detection value of the capacitor voltage is eliminated.

(ii) When DC current value Idc is positive (polarity=1) and a capacitor voltage is greater than a command value thereof, the compensator outputs a negative signal and therefore a voltage correction value for control of a circulating current serves as a signal having a negative DC component as a result of multiplication of the output from the compensator by the polarity (=1) of DC current Idc. With a signal of this voltage correction value, a period during which switching element 1a in FIG. 5 is conducting is shorter and therefore a difference between the capacitor voltage command value and a detection value of the capacitor voltage is eliminated.

(iii) When DC current value Idc is negative (polarity=−1) and a capacitor voltage is smaller than a command value thereof, the compensator outputs a positive signal and therefore a voltage correction value for control of a circulating current serves as a signal having a negative DC component as a result of multiplication of the output from the compensator by the polarity (=−1) of DC current Idc. With the signal of this voltage correction value, a period during which switching element 1a in FIG. 5 is conducting is shorter and therefore a period during which DC current Idc flows out of DC capacitor 1e is shorter. Consequently, since a time period of discharging of DC capacitor 1e decreases (charged), a difference between the capacitor voltage command value and a detection value of the capacitor voltage is eliminated.

(iv) When DC current value Idc is negative (polarity=−1) and a capacitor voltage is greater than a command value thereof, the compensator outputs a negative signal and therefore a voltage correction value for control of a circulating current serves as a signal having a positive DC component as a result of multiplication of the output from the compensator by the polarity (=−1) of DC current Idc. With the signal of this voltage correction value, a period during which switching element 1a in FIG. 5 is conducting is longer and therefore a time period of discharging of DC capacitor 1e is longer. Therefore, a difference between the capacitor voltage command value and a detection value of the capacitor voltage is eliminated.

Effect of Second Embodiment

As set forth above, the power conversion device according to the second embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device as in the first embodiment. With cell groups 6a and 6b, an electric quantity of each of AC terminals Nu, Nv, and Nw and DC terminals Np and Nn can reliably be controlled without interference by control of a circulating current.

Furthermore, the power conversion device according to the second embodiment can control a value of a circulating current in accordance with a circulating current command value by including cell groups 6c and 6d for control of a circulating current. Voltage command value Vpref2 for positive-side cell group 6c is generated by adding a value in proportion to voltage command value Vpref for positive-side cell group 6a as a bias value to voltage command value Vccref for control of a circulating current and adding voltage correction value Vpcorr based on a cell capacitor voltage of positive-side cell group 6c. Similarly, voltage command value Vnref2 for negative-side cell group 6d is generated by adding a value in proportion to voltage command value Vnref for negative-side cell group 6b as a bias value to voltage command value Vccref for control of a circulating current and adding voltage correction value Vncorr based on a cell capacitor voltage of negative-side cell group 6d. A voltage of DC capacitor 1e of each cell 20 in cell groups 6c and 6d can be maintained at a constant value without being affected by a loss in reactors 7a and 7b and/or variation in electric quantity.

[Modification]

As in the first embodiment, in each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portion 5n, adder 5i, gain circuit 5g, and capacitor voltage control portion 5q associated therewith are not required either, which is advantageous in simplification of the configuration of control device 5. Similarly, when only reactor 7a on the positive side is provided, negative-side cell group 6d for control of a circulating current is not required and gate control portion 5o, adder 5j, gain circuit 5h, and capacitor voltage control portion 5r associated therewith are not required either, which is advantageous in simplification of the configuration of control device 5.

Though an example in which capacitor voltage control portions 5q and 5r multiply an output from the compensator by a polarity of DC current value Idc is shown in the embodiment above, the same effect is achieved also by multiplying the output from the compensator by DC current value Idc itself instead of the polarity of DC current value Idc. When DC control portion 5d carries out feedback control based on a difference between a DC current command value and DC current value Idc, the same effect is achieved also by multiplying the output from the compensator by a DC current command value instead of a polarity of DC current value Idc. The same effect is obtained also by multiplying an output from the compensator of each phase by an AC current value of each phase (Iacu of the U phase, Iacv of the V phase, and Iacw of the W phase) or a polarity thereof instead of a polarity of DC current value Idc in capacitor voltage control portion 5q. The same effect is obtained also by multiplying an output from the compensator of each phase by an AC current value opposite in polarity of each phase (−Iacu of the U phase, −Iacv of the V phase, and −Iacw of the W phase) or a polarity thereof in capacitor voltage control portion 5r.

As shown in FIG. 6, AC control portion 5c, DC control portion 5d, and command value combination portions 5e and 5f may be configured as first control unit 12a with a dedicated FPGA or microprocessor, voltage operation 5p, capacitor voltage control 5q and 5r, circulating current control portion 5b, gain circuits 5g and 5h, and adders 5i and 5j may be configured as second control unit 12b with an FPGA or a microprocessor separate from first control unit 12a, and each of control units 12a and 12b may be configured with an FPGA or a microprocessor inexpensive and low in operation capability.

Third Embodiment

Though a power conversion device in a third embodiment is the same as the second embodiment shown in FIG. 4 in overall configuration, control device 5 is different in part from FIG. 6 in the second embodiment in configuration and operations. Specific description will be given below with reference to FIGS. 4 and 7.

[Configuration of Control Device 5]

Figure 7:
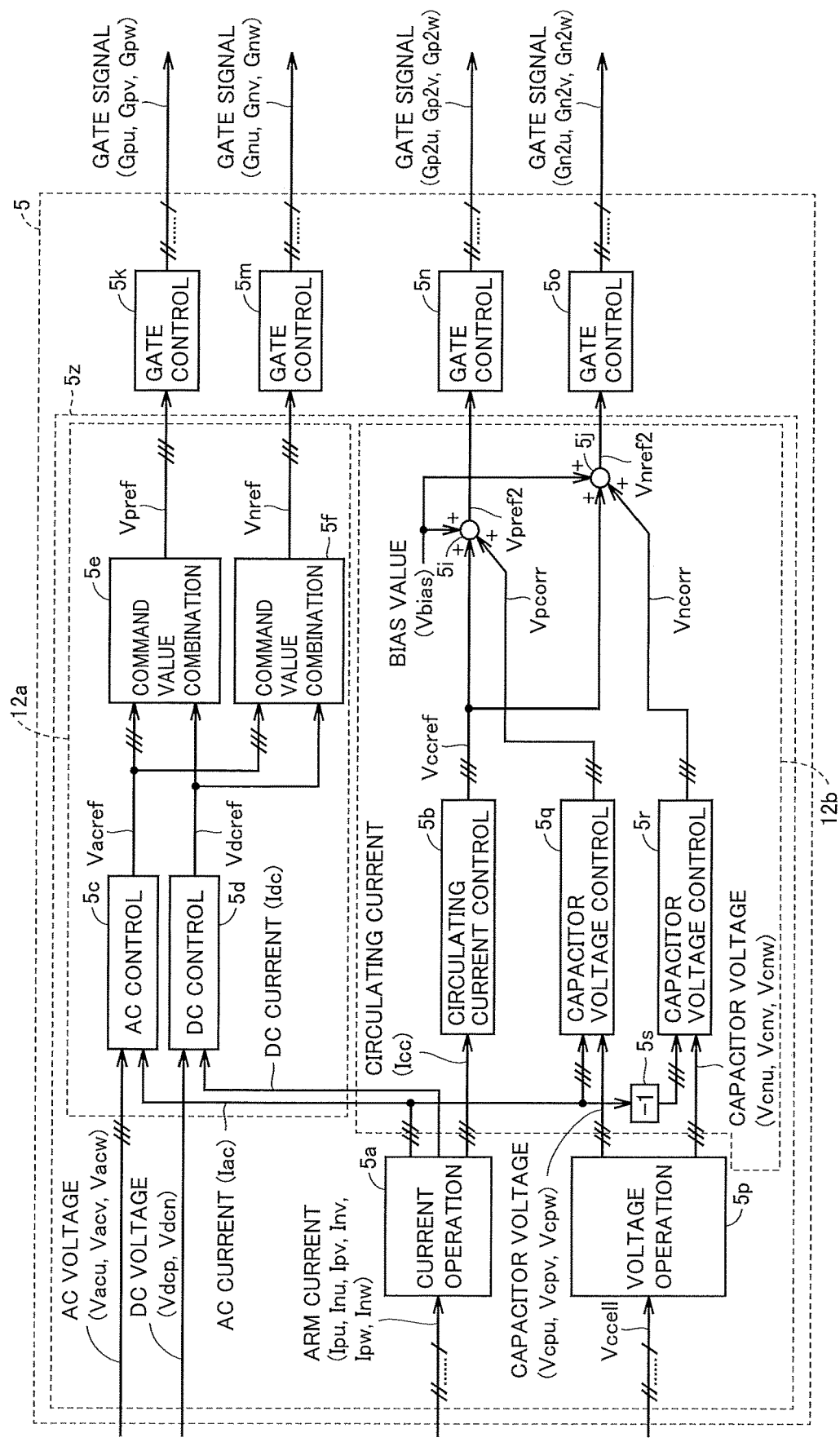
FIG. 7 is a configuration diagram of the control device included in the power conversion device according to a third embodiment.

FIG. 7 is a configuration diagram of control device 5 included in the power conversion device according to the third embodiment. Control device 5 in FIG. 7 is different from control device 5 in FIG. 6 in that a prescribed bias value Vbias is input to each of adders 5i and 5j instead of values in proportion to voltage command values Vpref and Vnref. Control device 5 in FIG. 7 is different from control device 5 in FIG. 6 in that AC current values Iacu, Iacv, and Iacw instead of DC current value Idc are input to capacitor voltage control portion 5q. Control device 5 in FIG. 7 is further different from control device 5 in FIG. 6 in that AC current values −Iacu, −Iacv, and −Iacw opposite in polarity which are obtained by multiplication by −1 by gain circuit 5s instead of DC current value Idc are input to capacitor voltage control portion 5r. Since FIG. 7 is otherwise the same in configuration as FIG. 6, elements the same as those or corresponding to those in FIG. 6 have the same reference characters allotted and description may not be repeated below.

[Operation of Control Device 5]

An operation of control device 5 in FIG. 7 will now be described. Description of an operation in common to that in FIG. 3 in the first embodiment and FIG. 6 in the second embodiment will not be repeated.

Voltage command value Vccref for control of a circulating current output from circulating current control portion 5b (Vccrefu of the U phase, Vccrefv of the V phase, and Vccrefw of the W phase) is a signal having a polarity of both of positive and negative. Therefore, when converter cell 20 constituting cell groups 6c and 6d is configured as a half bridge as shown in FIG. 2 (a) or 5, a bias is required for a voltage command value. In the third embodiment, the bias is set as bias value Vbias. Though bias value Vbias is desirably constant, it may periodically vary unless it is significantly deviated from a desired value.

Capacitor voltage control portion 5q generates voltage correction values Vpcorru, Vpcorrv, and Vpcorrw for control of a circulating current by amplifying a difference between capacitor voltage values Vcpu, Vcpv, and Vcpw and a capacitor voltage command value for each phase and multiplying the amplified difference by AC current values Iacu, Iacv, and Iacw, respectively. Similarly, capacitor voltage control portion 5r generates voltage correction values Vncorru, Vncorrv, and Vncorrw for control of a circulating current by amplifying a difference between capacitor voltage values Vcnu, Vcnv, and Vcnw and a capacitor voltage command value for each phase and multiplying the amplified difference by AC current values −Iacu, −Iacv, and −Iacw opposite in polarity, respectively.

When a DC current flows in cell groups 6c and 6d, active power is generated in each cell 20 constituting cell groups 6c and 6d in accordance with a set value of bias value Vbias representing a DC value and consequently DC capacitor 1e of each cell 20 is charged or discharges. When a difference is thus produced between the voltage of DC capacitor 1e and the capacitor voltage command value, capacitor voltage control portions 5q and 5r generate voltage correction values Vpcorr and Vncorr for control of a circulating current by amplifying the difference and multiplying the difference by an AC current value (or an AC current value opposite in polarity). Voltage correction values Vpcorr and Vncorr serve for control of each cell 20 in cell groups 6c and 6d so as to output an AC voltage in phase with (or opposite in phase to) the AC current. As each cell 20 generates an AC voltage in accordance with voltage correction values Vpcorr and Vncorr, the generated AC voltage interacts with an AC current which actually flows and hence active power is generated. As AC active power and DC power are balanced, a difference between a voltage value of DC capacitor 1e of each cell 20 and the capacitor voltage command value decreases and the DC capacitor voltage is subjected to feedback control so as to match with the capacitor voltage command value.

Effect of Third Embodiment

As set forth above, the power conversion device according to the third embodiment includes cell groups 6a and 6b which exclusively (that is, without being used for control of a circulating current) control an electric quantity (a current and a voltage) of each of AC terminals Nu, Nv, and Nw and DC terminals Np and Nn, which is a main purpose of the power conversion device as in the first and second embodiments. With cell groups 6a and 6b, an electric quantity of each of AC terminals Nu, Nv, and Nw and DC terminals Np and Nn can reliably be controlled without interference by control of a circulating current.

Furthermore, the power conversion device according to the third embodiment can control a value of a circulating current in accordance with a circulating current command value by including cell groups 6c and 6d for control of a circulating current. Voltage command value Vnref2 for positive-side cell group 6c is generated by adding bias value Vbias set in advance to voltage command value Vccref for control of a circulating current and adding voltage correction value Vpcorr based on a cell capacitor voltage and an AC current value of positive-side cell group 6c. Similarly, voltage command value Vpref2 for negative-side cell group 6d is generated by adding bias value Vbias set in advance to voltage command value Vccref for control of a circulating current and adding voltage correction value Vncorr based on a cell capacitor voltage and an AC current value opposite in polarity of negative-side cell group 6d. A voltage of DC capacitor 1e of each cell 20 in cell groups 6c and 6d can thus be maintained at a constant value without being affected by a loss in reactors 7a and 7b and variation in electric quantity.

[Modification]

As in the second embodiment, in each leg circuit 8, only reactor 7a on the positive side of reactors 7a and 7b may be provided or only reactor 7b on the negative side may be provided. When only reactor 7b on the negative side is provided, positive-side cell group 6c for control of a circulating current is not required and gate control portion 5n, adder 5i, and capacitor voltage control portion 5q associated therewith are not required either, which is advantageous in simplification of the configuration of control device 5. Similarly, when only reactor 7a on the positive side is provided, negative-side cell group 6d for control of a circulating current is not required and gate control portion 5o, adder 5j, and capacitor voltage control portion 5r associated therewith are not required either, which is advantageous in simplification of the configuration of control device 5.

The embodiment above shows an example in which an AC current value and an AC current value opposite in polarity thereto are input to capacitor voltage control portions 5q and 5r, respectively. When feedback control based on a difference between an AC current value and an AC current command value is carried out in AC control portion 5c, the same effect is achieved also by inputting an AC current command value instead of an AC current value to capacitor voltage control portions 5q and 5r.

In the embodiment above, the same effect is achieved also by setting bias value Vbias to a DC voltage command value or a value corresponding to a DC current value. The DC voltage command value is designed such that a DC component of an output voltage from each cell is set to 40 to 60% of a duty. Bias value Vbias is desirably set within this range of DC voltage command values.

As shown in FIG. 7, AC control portion 5c, DC control portion 5d, and command value combination portions 5e and 5f may be configured as first control unit 12a with a dedicated FPGA or microprocessor, gain circuit 5s, capacitor voltage control portions 5q and 5r, circulating current control portion 5b, and adders 5i and 5j may be configured as second control unit 12b with an FPGA or a microprocessor separate from first control unit 12a, and each of control units 12a and 12b may be configured with an FPGA or a microprocessor inexpensive and low in operation capability.

It should be understood that the embodiments disclosed herein are illustrative and non-restrictive in every respect. The scope of this invention is defined by the terms of the claims rather than the description above and is intended to include any modifications within the scope and meaning equivalent to the terms of the claims.

REFERENCE SIGNS LIST 1, 20 converter cell (chopper cell); 1a, 1b, 1f, 1g semiconductor switching element; 1c, 1d, 1h, 1i diode; 1e DC capacitor; 1*j*, 11*a*, 11*b* DC voltage detector; 2 AC circuit; 3 interconnected transformer; 4 DC circuit; 5 control device; 5*a* current operation portion; 5*b* circulating current control portion; 5*c* AC control portion; 5*d* DC control portion; 5*e*, 5*f* command value combination portion; 5*g*, 5*h*, 5*s* gain circuit; 5*i*, 5*j* adder; 5*k*, 5*m*, 5*n*, 5*o* gate control portion; 5*p* voltage operation portion; 5*q*, 5*r* capacitor voltage control portion; 5*z* voltage command value generation portion; 6*a*, 6*c* positive-side cell group; 6*b*, 6*d* negative-side cell group; 7*a*, 7*b* reactor; 8*a*, 8*b*, 8*c* leg circuit; 9*a*, 9*b* arm current detector; 10 AC voltage detector; 13 positive-side arm; and 14 negative-side arm

The invention claimed is:

1. A power conversion device which converts power between a DC circuit and an AC circuit, the power conversion device comprising:
a plurality of leg circuits which correspond to respective phases of the AC circuit and are connected in parallel between common first and second DC terminals, each leg circuit including:
a plurality of converter cells each including an energy storage and cascaded to one another; and
at least one inductance connected in series to the plurality of converter cells; and
a control device which controls operations of the plurality of converter cells,
the control device controlling an operation of at least one converter cell included in each leg circuit based on a circulating current which circulates among the leg circuits, and controlling an operation of at least another converter cell not based on the circulating current,
each leg circuit being divided into a first arm and a second arm with a connection portion electrically connected to a corresponding phase of the AC circuit being interposed,
the first arm of each leg circuit including:
a plurality of first converter cells controlled not based on the circulating current;
a plurality of second converter cells controlled based on the circulating current; and
a first inductance,
the second arm of each leg circuit including a plurality of third converter cells controlled not based on the circulating current,
the control device generating a first voltage command value for controlling output voltages from the plurality of first converter cells for each leg circuit based on a DC current and a DC voltage from the DC circuit and an AC current and an AC voltage of each phase from the AC circuit,
the control device generating a second voltage command value for controlling output voltages from the plurality of second converter cells by linearly combining a first value based on a difference between the circulating current and a circulating current command value with the first voltage command value for each leg circuit.

2. The power conversion device according to claim 1, wherein:
the energy storage is a capacitor;
each second converter cell further includes a voltage detector which detects a voltage of the capacitor; and
the control device generates the second voltage command value by further linearly combining a second value based on a difference between the voltage of the capacitor and a command value for the voltage of the capacitor with the first value and the first voltage command value.

3. The power conversion device according to claim 2, wherein:
the second value is corrected based on the DC current from the DC circuit; and
the second voltage command value is generated with the corrected second value.

4. The power conversion device according to claim 2, wherein:
the second value is corrected based on the AC current from the AC circuit; and
the second voltage command value is generated with the corrected second value.

5. A power conversion device which converts power between a DC circuit and an AC circuit, the power conversion device comprising:
a plurality of leg circuits which correspond to respective phases of the AC circuit and are connected in parallel between common first and second DC terminals, each leg circuit including:
a plurality of converter cells each including an energy storage and cascaded to one another; and
at least one inductance connected in series to the plurality of converter cells; and
a control device which controls operations of the plurality of converter cells,
the control device controlling an operation of at least one converter cell included in each leg circuit based on a circulating current which circulates among the leg circuits, and controlling an operation of at least another converter cell not based on the circulating current,
each leg circuit being divided into a first arm and a second arm with a connection portion electrically connected to a corresponding phase of the AC circuit being interposed,
the first arm of each leg circuit including:
a plurality of first converter cells controlled not based on the circulating current;
a plurality of second converter cells controlled based on the circulating current; and
a first inductance,
the second arm of each leg circuit including a plurality of third converter cells controlled not based on the circulating current,
the energy storage being a capacitor,
each second converter cell further including a voltage detector which detects a voltage of the capacitor;
the control device generating a first voltage command value for controlling output voltages from the plurality of first converter cells for each leg circuit based on a DC current and a DC voltage from the DC circuit and an AC current and an AC voltage of each phase from the AC circuit; and
the control device generating a second voltage command value for controlling output voltages from the plurality of second converter cells by linearly combining a first value based on a difference between the circulating current and a circulating current command value, a second value resulting from correction of a difference between the voltage of the capacitor and a command value for the voltage of the capacitor based on the AC current from the AC circuit, and a bias value set in advance with one another for each leg circuit.

6. The power conversion device according to claim 1, wherein each second converter cell is of a half bridge type.

7. A power conversion device which converts power between a DC circuit and an AC circuit, the power conversion device comprising:

a plurality of leg circuits which correspond to respective phases of the AC circuit and are connected in parallel between common first and second DC terminals, each leg circuit including:
  a plurality of converter cells of a half bridge type each including an energy storage and cascaded to one another; and
  at least one inductance connected in series to the plurality of converter cells; and
a control device which controls operations of the plurality of converter cells of each leg circuit,
the control device configured to:
  control at least one converter cell included in a leg circuit to control a circulating current which flows through the leg circuit; and
  control another converter cell included in the leg circuit not to control the circulating current which flows through the leg circuit and to control a current other than the circulating current which flows through the leg circuit, wherein:
the control device includes:
  a first control unit configured to control at least one converter cell included in a leg circuit to control a circulating current which flows through the leg circuit; and
  a second control unit separate from the first control unit and configured to control another converter cell included in the leg circuit not to control the circulating current which flows through the leg circuit and to control a current other than the circulating current which flows through the leg circuit.

8. A power conversion device which converts power between a DC circuit and an AC circuit, the power conversion device comprising:
  a plurality of leg circuits which correspond to respective phases of the AC circuit and are connected in parallel between common first and second DC terminals, each leg circuit including:
    a plurality of converter cells of a single half bridge type each including an energy storage and cascaded to one another; and
    at least one inductance connected in series to the plurality of converter cells; and
  a control device which controls operations of the plurality of converter cells,
  the control device controlling an operation of at least one converter cell included in each leg circuit based on a circulating current which circulates among the leg circuits, and controlling an operation of at least another converter cell not based on the circulating current.

9. The power conversion device according to claim 5, wherein each second converter cell is of a half bridge type.

10. The power conversion device according to claim 1, wherein the second arm of each leg circuit further includes a plurality of fourth converter cells controlled based on the circulating current and a second inductance.

11. The power conversion device according to claim 5, wherein the second arm of each leg circuit further includes a plurality of fourth converter cells controlled based on the circulating current and a second inductance.

12. A power conversion device which converts power between a DC circuit and an AC circuit, the power conversion device comprising:
  a plurality of leg circuits which correspond to respective phases of the AC circuit, each leg circuit including a plurality of converter cells each including an energy storage; and
  a control device which controls an operation of at least one of the plurality of converter cells,
  the control device generating a voltage command value for controlling the at least one converter cell by linearly combining a value based on a difference between a circulating current which circulates through the leg circuit and a circulating current command value with a voltage command value of a remaining converter cell of the plurality of converter cells.

13. A power conversion device which converts power between a DC circuit and an AC circuit, the power conversion device comprising:
  a plurality of leg circuits which correspond to respective phases of the AC circuit, each leg circuit including a plurality of converter cells each including an energy storage; and
  a control device which controls an operation of at least one of the plurality of converter cells,
  the control device generating a voltage command value for controlling the at least one converter cell by linearly combining a first value based on a difference between a circulating current which circulates through the leg circuit and a circulating current command value, a second value resulting from correction of a difference between a voltage of the energy storage and a command value of the voltage of the energy storage based on an AC current from the AC circuit, and a bias value set in advance with one another.

\* \* \* \* \*